(12) United States Patent
Umino et al.

(10) Patent No.: US 9,328,214 B2
(45) Date of Patent: May 3, 2016

(54) FLUORINATED COPOLYMER COMPOSITION

(71) Applicant: ASAHI GLASS COMPANY, LIMITED, Chiyoda-ku (JP)

(72) Inventors: Masao Umino, Tokyo (JP); Sadao Kanetoku, Tokyo (JP); Shinji Wada, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 57 days.

(21) Appl. No.: 14/164,413

(22) Filed: Jan. 27, 2014

(65) Prior Publication Data

US 2014/0135438 A1   May 15, 2014

Related U.S. Application Data

(63) Continuation of application No. PCT/JP2012/068390, filed on Jul. 19, 2012.

(30) Foreign Application Priority Data

Jul. 26, 2011   (JP) .................................. 2011-162683

(51) Int. Cl.
  *C08K 3/22*    (2006.01)
  *C08F 214/26*  (2006.01)

(52) U.S. Cl.
  CPC .................. *C08K 3/22* (2013.01); *C08F 214/26* (2013.01); *C08F 214/265* (2013.01); *C08K 2003/2248* (2013.01)

(58) Field of Classification Search
  USPC ......................................... 524/430, 544, 545
  See application file for complete search history.

(56) References Cited

U.S. PATENT DOCUMENTS 8,829,132 B2 * 9/2014 Taguchi et al. ............... 526/255

FOREIGN PATENT DOCUMENTS

| EP | 2 336 238 A1 | 6/2011 |
|----|---|---|
| EP | 2236238 A1 * | 6/2011 |
| EP | 2 423 237 A1 | 2/2012 |
| EP | 2423237 A1 * | 2/2012 |
| JP | 52-25850 | 2/1977 |
| JP | 52-44895 | 11/1977 |
| JP | 54-33583 | 3/1979 |
| JP | 5-271508 | 10/1993 |
| JP | 2000-212365 | 8/2000 |
| JP | 2002-348302 | 12/2002 |
| JP | 2006-206637 | 8/2008 |
| JP | 2011-225677 | * 11/2011 |
| WO | 2010/041542 | 4/2010 |
| WO | WO-2010/041542 A1 * | 4/2010 |
| WO | WO-2011/007705 A1 * | 1/2011 |
| WO | WO-2013/015202 A1 * | 1/2013 |

OTHER PUBLICATIONS

Extended European Search Report issued on Jan. 21, 2015 in Application No. 12816984.4.
International Search Report issued Oct. 23, 2012 in PCT/JP2012/068390 filed Jul. 19, 2012.
"Fluororesin Handbook" edited by Takaomi Satokawa, p. 489 to 499, 1990, published by Nikkan Kogyo Shimbum Ltd.

* cited by examiner

*Primary Examiner* — Peter D Mulcahy
*Assistant Examiner* — Henry Hu
(74) *Attorney, Agent, or Firm* — Oblon, McClelland, Maier & Neustadt, L.L.P.

(57) ABSTRACT

A fluorinated copolymer composition comprises ethylene/tetrafluoroethylene-containing copolymer and copper oxide. The ethylene/tetrafluoroethylene-containing copolymer comprises repeating units (A) based on ethylene, repeating units (B) based on tetrafluoroethylene and repeating units (C) based on another monomer, in a molar ratio of the repeating units (A) to the repeating units (B) of from 38/62 to 44/56, and in an amount of the repeating units (C) of from 0.1 to 2.6 mol % in all the repeating units of the ethylene/tetrafluoroethylene-containing copolymer. The content of the copper oxide is from 0.2 to 10 ppm based on the total weight of ethylene/tetrafluoroethylene-containing copolymer. The copper oxide has a BET surface area of from 5 to 30 m²/g. The volume flow rate of the fluorinated copolymer composition at 297° C. is from 15 to 150 g/10 min.

14 Claims, No Drawings

FLUORINATED COPOLYMER COMPOSITION

TECHNICAL FIELD

The present invention relates to a fluorinated copolymer composition excellent in the heat resistance and the stress crack resistance.

BACKGROUND ART

An ethylene/tetrafluoroethylene copolymer (hereinafter sometimes referred to as "ETFE") is excellent in heat resistance, weather resistance, electrical insulation properties, non-tackiness, water/oil repellency, and so on, and in particular, it is characterized in that it has high moldability and mechanical strength among fluororesins. Thus, a broad range of molding processed products including covered electric wires, tubes, sheets, films, filaments, pump casing, joints, packing, lining and coating have been manufactured by molding ETFE by a melt molding method such as extrusion, blow molding, injection molding or rotational molding (for example, Non-Patent Document 1).

In recent years, ETFE molded products become small in size, complicated and thin, and demands for cost reduction by improvement in productivity by high speed molding are increasing. To meet such requirements, ETFE is required to have a higher melt flowability.

To increase the melt flowability of ETFE, it is effective to decrease the molecular weight of ETFE. However, if the molecular weight of ETFE is decreased, the heat resistance, the stretch crack resistance, etc., characteristic to ETFE, tend to be low.

Patent Document 1 discloses that a fluorinated copolymer composition having excellent moldability can be obtained without decreasing mechanical strength of a molded product, by blending an ETFE having a low melt viscosity and an ETFE having a high melt viscosity.

Patent Document 2 discloses that ETFE having excellent stress crack resistance can be obtained by controlling the polymerization rate of ethylene and tetrafluoroethylene.

However, both of the high speed moldability of a fluorinated copolymer composition, and the heat resistance and the stress crack resistance of a molded product, cannot simultaneously be satisfied by the methods disclosed in Patent Documents 1 and 2.

Further, Patent Document 3 discloses that by adding an effective amount within a range of at most 10 parts by weight of copper oxide per 100 parts by weight of ETFE, a fluorinated copolymer composition excellent in thermal stability can be obtained without coloring or foaming even exposed to the air atmosphere at a temperature of at least 340° C. for a long period of time.

However, the thermal stability in Patent Document 3 means thermal stability against the heat history at the time of molding, for the purpose of preventing decomposition, foaming, coloring and the like of ETFE at the time of molding, and improvement of the heat resistance and the stress crack resistance of a molded product are not studied at all.

PRIOR ART DOCUMENTS

Patent Documents

Patent Document 1: JP-A-2000-212365
Patent Document 2: JP-A-2002-348302
Patent Document 3: JP-B-52-44895

Non-Patent Document

Non-Patent Document 1: "Fluororesin Handbook" edited by Takaomi Satokawa, p. 489 to 499, 1990, published by Nikkan Kogyo Shimbum Ltd.

DISCLOSURE OF INVENTION

Technical Problem

The object of the present invention is to provide a fluorinated copolymer composition from which a molded product excellent in the heat resistance and the stress crack resistance can be produced with good productivity.

Solution to Problem

The present invention provides the following fluorinated copolymer composition.

[1] A fluorinated copolymer composition comprising an ethylene/tetrafluoroethylene copolymer and copper oxide,
wherein the ethylene/tetrafluoroethylene copolymer has repeating units (A) based on ethylene, repeating units (B) based on tetrafluoroethylene and repeating units (C) based on another monomer excluding ethylene and tetrafluoroethylene, copolymerizable with ethylene and tetrafluoroethylene, in a molar ratio of the repeating units (A) based on ethylene to the repeating units (B) based on tetrafluoroethylene of from 38/62 to 44/56, and contains the repeating units (C) based on another monomer in an amount of from 0.1 to 2.6 mol % in all the repeating units of the ethylene/tetrafluoroethylene copolymer;
the content of the copper oxide is from 0.2 to 10 ppm based on the ethylene/tetrafluoroethylene copolymer; and
the volume flow rate of the fluorinated copolymer composition at 297° C. is from 15 to 150 g/10 min.

[2] The fluorinated copolymer composition according to the above [1], wherein the ethylene/tetrafluoroethylene copolymer has a molar ratio of the repeating units (A) based on ethylene to the repeating units (B) based on tetrafluoroethylene of from 39/61 to 42/58.

[3] The fluorinated copolymer composition according to the above [1] or [2], wherein the melting point of the ethylene/tetrafluoroethylene copolymer is from 235 to 275° C.

[4] The fluorinated copolymer composition according to any one of the above [1] to [3], wherein the copper oxide has an average particle size of from 0.1 to 10 μm and a BET surface area of from 5 to 30 m$^2$/g.

[5] The fluorinated copolymer composition according to any one of the above [1] to [4], wherein the copper oxide is cupric oxide.

[6] The fluorinated copolymer composition according to any one of the above [1] to [5], wherein the content of the copper oxide is from 0.5 to 5 ppm based on the ethylene/tetrafluoroethylene copolymer.

[7] The fluorinated copolymer composition according to any one of the above [1] to [6], wherein another monomer is a compound represented by $CH_2=CX(CF_2)_nY$ (wherein each of X and Y which are independent of each other, is a hydrogen atom or a fluorine atom, and n is an integer of from 1 to 10).

[8] The fluorinated copolymer composition according to the above [7], wherein another monomer is a compound represented by $CH_2=CH(CF_2)_nF$ (wherein n is an integer of from 2 to 8).

[9] The fluorinated copolymer composition according to any one of the above [1] to [8], wherein the volume flow rate of the fluorinated copolymer composition is from 20 to 60 g/10 min.

Advantageous Effects of Invention

The fluorinated copolymer composition of the present invention has high melt flowability, is capable of high speed molding, and can reduce the cost for production of a molded product by improvement in the productivity. Particularly in the case of injection molding, it can be molded into a thin and complicated shape since it has favorable melt flowability.

Further, a molded product obtained from the fluorinated copolymer composition of the present invention is excellent in the heat resistance and the stress crack resistance, and for example, in a case where the fluorinated copolymer composition of the present invention is used for a covering material for electric wires, it is possible to make the covering layer thin.

DESCRIPTION OF EMBODIMENTS

The fluorinated copolymer composition of the present invention comprises an ethylene/tetrafluoroethylene copolymer (ETFE) and copper oxide.

ETFE has repeating units (A) based on ethylene (hereinafter sometimes referred to as "E"), repeating units (B) based on tetrafluoroethylene (hereinafter sometimes referred to as "TFE") and repeating units (C) based on another monomer (excluding E and TFE) copolymerizable with E and TFE.

The molar ratio (E/TFE) of the repeating units (A) based on E to the repeating units (B) based on TFE is from 38/62 to 44/56, preferably from 39/61 to 42/58, most preferably from 40/60 to 42/58. If the proportion of the repeating units (A) based on E is higher than this range, the heat resistance, the weather resistance, the chemical resistance, etc. of a molded product of the fluorinated copolymer composition (hereinafter sometimes referred to as "molded product") are decreased in some cases. If the proportion of the repeating units (A) based on E is lower than this range, the melting point of ETFE may be decreased, or the mechanical strength of the molded product may be decreased. The molar ratio (E/TFE) can be controlled by the proportion of E and TFE initially charged at the time of production of ETFE by polymerization. That is, the proportion of the repeating units (B) based on TFE can be increased by a larger amount of TFE initially charged than the amount of E initially charged. Further, another monomer may be added all at once initially, or may be continuously added during polymerization.

Another monomer for the repeating units (C) may, for example, be the following (1) to (7). Such another monomer may be used alone or in combination of two or more.

(1) A compound represented by the formula $CH_2=CX(CF_2)_nY$ (wherein each of X and Y which are independent of each other, is a hydrogen atom or a fluorine atom, and n is an integer of from 1 to 10).

(2) An olefin (excluding E) such as propylene, butene or isobutylene.

(3) A fluoroolefin (excluding TFE) having no hydrogen atom in an unsaturated group, such as hexafluoropropylene (HFP) or chlorotrifluoroethylene (CTFE).

(4) A fluoroolefin having a hydrogen atom in an unsaturated group, such as vinylidene fluoride (VDF), vinyl fluoride (VF), trifluoroethylene or hexafluoroisobutylene (HFIB).

(5) A perfluoro(alkyl vinyl ether) (PAVE) such as perfluoro(methyl vinyl ether) (PMVE), perfluoro(ethyl vinyl ether) (PEVE), perfluoro(propyl vinyl ether) (PPVE) or perfluoro(butyl vinyl ether) (PBVE).

(6) A perfluorovinyl ether having two unsaturated bonds, such as $CF_2=CFOCF_2CF=CF_2$ or $CF_2=CFO(CF_2)_2CF=CF_2$.

(7) A fluorinated monomer having an alicyclic structure, such as perfluoro(2,2-dimethyl-1,3-dioxol) (PDD), 2,2,4-trifluoro-5-trifluoromethoxy-1,3-dioxole or perfluoro(2-methylene-4-methyl-1,3-dioxolane).

Among them, another monomer is preferably a compound represented by $CH_2=CX(CF_2)_nY$ (hereinafter referred to as "FAE"). X in the formula is preferably a hydrogen atom. Y in the formula is preferably a fluorine atom. n in the formula is preferably from 2 to 8, more preferably from 2 to 6, particularly preferably 2, 4 or 6. If n is less than 2, the heat resistance or the stress crack resistance of the molded product tend to be decreased. If n in the formula exceeds 10, the polymerizability may be insufficient. Particularly, n is preferably within a range of from 2 to 8, whereby the polymerizability of FAE is favorable. Further, a molded product excellent in the heat resistance and the stress crack resistance is likely to be obtained. One or more types of FAE may be used.

Preferred specific examples of FAE include $CH_2=CH(CF_2)_2F$, $CH_2=CH(CF_2)_4F$, $CH_2=CH(CF_2)_6F$, $CH_2=CF(CF_2)_4F$ and $CH_2=CF(CF_2)_3H$.

ETFE contains the repeating units (C) based on another monomer in an amount of from 0.1 to 2.6 mol % in all the repeating units of the ETFE. The content of the repeating units (C) based on another monomer is preferably from 0.2 to 2.5 mol %, more preferably from 0.5 to 2.3 mol %. If the content of the repeating units (C) is less than 0.1 mol %, the stress crack resistance of the molded product will be decreased. If it exceeds 2.5 mol %, the melting point of ETFE will be decreased, and the heat resistance of the molded product will be decreased.

The content of the repeating units (C) can be controlled by adjusting the amount of addition of another monomer at the time of production of ETFE by polymerization.

The volume flow rate of ETFE at 297° C. is from 15 to 150 g/10 min, preferably from 20 to 100 g/10 min, more preferably from 20 to 70 g/10 min, most preferably from 20 to 60 g/10 min. The volume flow rate is an index of the molecular weight, and a low volume flow rate indicates high molecular weight and a high volume flow rate indicates a low molecular weight. If the volume flow rate is less than 15 g/10 min, such ETFE is not suitable for high speed molding, and if it exceeds 150 g/10 min, the stress crack resistance of the molded product will be decreased. Within the above range, excellent high speed moldability is obtained, and excellent stress crack resistance is also obtained. In the present invention, the volume flow rate is measured by a method disclosed in the after-mentioned Examples.

The volume flow rate of ETFE can be controlled by adjusting the molecular weight of ETFE.

For example, the volume flow rate of ETFE at 297° C. can be adjusted to be from 15 to 150 g/10 min by adjusting the weight average molecular weight of the ETFE to be from about 300,000 to about 600,000.

The melting point of ETFE is preferably from 235 to 275° C., more preferably from 237 to 270° C., most preferably from 240 to 260° C. If the melting point is less than 235° C., the molded product tends to have poor heat resistance, and it may be melted down in 232° C. heat resistance test specified by UL standards 1581 and does not comply with the standards. If the melting point exceeds 275° C., the stress crack resistance of the molded product may be decreased. In order to increase the melting point of ETFE, it is considered to make the molar ratio (E/TFE) closer to 50/50 and to reduce the content of another monomer thereby to increase crystallinity. Further, in order to decrease the melting point, it is considered to make the molar ratio (E/TFE) far from 50/50 e.g. by increasing the content of TFE and to increase the content of another monomer thereby to lower the crystallinity.

The method for producing ETFE to be used in the present invention is not particularly limited, and a commonly employed polymerization method using a radical polymerization initiator may be employed. The polymerization method may, for example, be bulk polymerization, solution polymerization, suspension polymerization or emulsion polymerization. Particularly preferred is solution polymerization.

The radical polymerization initiator to be used for polymerization is preferably a radical polymerization initiator having a half-life of 10 hours at a temperature of from 0 to 100° C., more preferably at a temperature of from 20 to 90° C.

The radical polymerization initiator may, for example, be specifically an azo compound such as azobisisobutyronitrile; a peroxydicarbonate such as diisopropyl peroxydicarbonate; a peroxyester such as tert-butyl peroxypivalate, tert-butyl peroxyisobutyrate or tert-butyl peroxyacetate; a non-fluorine type diacyl peroxide such as isobutyryl peroxide, octanoyl peroxide, benzoyl peroxide or lauroyl peroxide; a fluorine-containing diacyl peroxide such as $(Z(CF_2)_pCOO)_2$ (wherein Z is a hydrogen atom, a fluorine atom or a chlorine atom, and p is an integer of from 1 to 10); perfluoro-tert-butyl peroxide; or an inorganic peroxide such as potassium persulfate, sodium persulfate or ammonium persulfate.

In a case where ETFE is produced by solution polymerization, the polymerization medium may, for example, be an organic solvent such as a fluorinated hydrocarbon, a chlorinated hydrocarbon, a chlorofluorohydrocarbon, an alcohol or a hydrocarbon.

The polymerization medium may, for example, be specifically a perfluorocarbon such as n-perfluorohexane, n-perfluoroheptane, perfluorocyclobutane, perfluorocyclohexane or perfluorobenzene; a hydrofluorocarbon such as 1,1,2,2-tetrafluorocyclobutane, $CF_3CFHCF_2CF_2CF_3$, $CF_3(CF_2)_4H$, $CF_3CF_2CFHCF_2CF_3$, $CF_3CFHCFHCF_2CF_3$, $CF_2HCFHCF_2CF_2CF_3$, $CF_3(CF_2)_5H$, $CF_3CH(CF_3)CF_2CF_2CF_3$, $CF_3CF(CF_3)CFHCF_2CF_3$, $CF_3CF(CF_3)CFH-CFHCF_3$, $CF_3CH(CF_3)CFHCF_2CF_3$, $CF_3CF_2CH_2CH_3$ or $CF_3(CF_2)_3CH_2CH_3$; or a hydrofluoroether such as $CF_3CH_2OCF_2CF_2H$, $CF_3(CF_3)CFCF_2OCH_3$ or $CF_3(CF_2)_3OCH_3$. Among them, $CF_3(CF_2)_5H$ or $CF_3CH_2OCF_2CF_2H$ is more preferred, and $CF_3(CF_2)_5H$ is most preferred.

The polymerization conditions are not particularly limited. The polymerization temperature is preferably from 0 to 100° C., more preferably from 20 to 90° C. The polymerization pressure is preferably from 0.1 to 10 MPa, more preferably from 0.5 to 3 MPa. The polymerization time is preferably from 1 to 30 hours.

In the present invention, the method of adjusting the molecular weight of ETFE i.e. the method of adjusting the volume flow rate of ETFE is not particularly limited. The method may, for example, be a method of adjusting the molecular weight at the time of polymerization e.g. by addition of a chain transfer agent or control of the polymerization pressure, a method of adjusting the molecular weight by cleaving molecules by application of an energy such as heat or radioactive rays to ETFE obtained by polymerization, or a method of adjusting the molecular weight by chemically cleaving a molecular chain of ETFE obtained by polymerization by a radial. Particularly preferred is a method of controlling the molecular weight at the time of polymerization using a chain transfer agent.

The chain transfer agent may, for example, be an alcohol such as methanol, ethanol, 2,2,2-trifluoroethanol, 2,2,3,3-tetrafluoropropanol, 1,1,1,3,3,3-hexafluoroisopropanol or 2,2,3,3,3-pentafluoropropanol; a chlorofluorohydrocarbon such as 1,3-dichloro-1,1,2,2,3-pentafluoropropane or 1,1-dichloro-1-fluoroethane; a hydrocarbon such as n-pentane, n-hexane, n-heptane or cyclohexane; a hydrofluorocarbon such as $CF_2H_2$; a ketone such as acetone, a mercaptan such as methyl mercaptan; an ester such as methyl acetate or ethyl acetate; or an ether such as diethyl ether or methyl ethyl ether. The amount of addition of the chain transfer agent is usually at a level of from 0.01 to 100 mass % based on the polymerization medium. It is possible to adjust the melt viscosity (molecular weight) of ETFE to be obtained by adjusting the amount of addition of the chain transfer agent. That is, the larger the amount of addition of the chain transfer agent, the lower the molecular weight of ETFE to be obtained.

The fluorinated copolymer composition of the present invention contains copper oxide. The copper oxide is preferably cupric oxide in view of excellent stability even in highly humid air. The content of the copper oxide is from 0.2 to 10 ppm based on ETFE, preferably from 0.3 to 7 ppm, more preferably from 0.3 to 5 ppm, most preferably from 0.5 to 5 ppm. If the content of the copper oxide is less than 0.2 ppm or exceeds 10 ppm, the heat resistance of the molded product will be decreased.

The average particle size of the copper oxide is preferably from 0.1 to 10 μm, more preferably from 0.5 to 5 μm. If it is less than 0.1 μm, the dispersibility into ETFE will be decreased, and physical properties of the molded product such as tensile strength and elongation may be decreased. If it exceeds 10 μm, the effect to improve the heat resistance of the molded product may be decreased. In the present invention, the average particle size of the copper oxide is a value measured by a laser scattering type particle size distribution measuring method.

The BET specific surface area of the copper oxide is preferably from 5 to 30 m²/g, more preferably from 10 to 20 m²/g. If it is less than 5 m²/g, the effect to improve the heat resistance of the molded product may be decreased. If it exceeds 30 m²/g, the copper oxide will agglomerate and its dispersibility into ETFE will be decreased, whereby physical properties of the molded product such as the tensile strength and elongation may be decreased.

The fluorinated copolymer composition of the present invention may contain another component to develop various properties. Such another component may, for example, be a pigment/dye such as carbon black, titanium oxide, copper phthalocyanine blue, perylene red, iron oxide or chrome yellow; a sliding property-imparting agent such as polytetrafluoroethylene lubricant or silicone oil; an electrical conductivity-imparting substance such as carbon black, carbon nanotubes, graphite, stannic oxide or ionized liquid; a fiber-reinforcing agent such as carbon fiber, glass fiber, aramid fiber, potassium titanate whisker, aluminum borate whisker or calcium carbonate whisker; a heat conductivity-imparting agent such as alumina, magnesium oxide or graphite; a filler such talc, cokes, mica or glass beads; a polymer material such as fluororubber, ethylene/propylene/diene rubber (EPDM), polyphenylene sulfide, polyether ether ketone, polyetherimide, polyamideimide, polysulfone, polyethersulfone, a liquid crystal polymer, a polyamide, a semi-aromatic polyamide, polytetrafluoroethylene (PTFE), polychlorotrifluoroethylene (PCTFE), polyvinylidene fluoride (PVDF) or a chlorotrifluoroethylene/ethylene copolymer (ECTFE); a modifier such as aminosilane or phenylsilane; a crystal nucleus agent; a blowing agent; a blowing nucleus agent; a crosslinking agent such as triallyl isocyanurate; an antioxidant; a light stabilizer; or an ultraviolet absorber. The content of such another component may properly be selected depending upon properties to be imparted.

The volume flow rate of the fluorinated copolymer composition of the present invention at 297° C. is from 15 to 150 g/10 min, preferably from 20 to 100 g/10 min, more preferably from 20 to 70 g/10 min, most preferably from 20 to 60 g/min. If the volume flow rate is less than 15 g/10 min, such a composition is not suitable for high speed molding, and if it exceeds 150 g/10 min, the stress crack resistance of the molded product will be decreased. Within the above range, excellent high speed moldability is obtained, and excellent stress crack resistance is also obtained.

In a case where the fluorinated copolymer composition contains only a copper compound in a very small amount within the range of the present invention, the volume flow rate of the fluorinated copolymer composition is the same as the volume flow rate of ETFE. The method of adjusting the volume flow rate of the fluorinated copolymer composition may be a method of adjusting the volume flow rate of ETFE by adjusting the molecular weight of the ETFE by polymerization, a method of mixing and kneading ETFEs differing in the volume flow rate, or a method of adjusting the volume flow rate of the fluorinated copolymer by cleaving a molecular chain by heat when the fluorinated copolymer composition is pelletized.

The fluorinated copolymer composition of the present invention is molded by a known molding method such as injection molding, extrusion, blow molding, press molding, rotational molding or electrostatic deposition to form a molded product of the fluorinated copolymer composition.

The fluorinated copolymer composition of the present invention has favorable flowability at high temperature and is thereby excellent in moldability by high speed molding. Particularly in the case of injection molding, it can be molded into a thin and complicated shape since it has favorable melt flowability.

Further, the molded product of the fluorinated copolymer composition to be obtained by molding the fluorinated copolymer composition of the present invention is excellent in the heat resistance and the stress crack resistance, and is thereby suitably used for electric wire covering materials for various devices, such as (1) electric wire covering materials for electric machines and domestic electric apparatus, such as robots, electric motors, electricity generators and transformers, (2) electric wire covering materials for communication transmission apparatus such as telephones and radios, (3) electric wire covering materials for electronic apparatus such as computers, data communication equipment and terminal equipment, (4) electric wire covering materials for railway vehicles, (5) electric wire covering materials for automobiles, (6) electric wire covering materials for aircraft, (7) electric wire covering materials for shipping, and (8) electric wire covering materials for system configuration for e.g. electrical mains for buildings and plants, electric power plants, and petrochemical and iron manufacturing plants.

Further, by using the fluorinated copolymer composition of the present invention for electric wire covering materials, it is possible to make a covering layer thin, and it is thereby possible to reduce the size and the thickness of various apparatus.

Further, in addition to use for electric wire covering materials, it can be suitably used, for example, for a film, monofilaments or insert molding (injection molding).

EXAMPLES

Now, the present invention will be described in further detail with reference to Examples and Comparative Examples. However, it should be understood that the present invention is not limited thereto.

[ETFE Copolymer Composition]

The ETFE copolymer composition was obtained by melt NMR analysis and fluorine content analysis.

[Melting Point of ETFE]

Using a differential scanning calorimeter (DSC-220CU manufactured by Seiko Instruments Inc.), about 5 mg of a sample was heated from 100° C. to 300° C. at a rate of 10° C./min to obtain the melting point of ETFE.

[Volume Flow Rate (g/10 min)]

Using a melt flow tester manufactured by TechnoSeven Co., Ltd., ETFE or a fluorinated copolymer composition was extruded into an orifice having a diameter of 2.1 mm and a length of 8 mm under a load of 5 kg at a temperature of 297° C., and the rate of extrusion of the ETFE or the fluorinated copolymer composition was taken as the volume flow rate.

[Tensile Test (MPa) of Molded Product]

A fluorinated copolymer composition was pressed at 300° C. to prepare a 1 mm thick sheet. From this sheet, a molded product sample was punched by a dumbbell of ASTM D Type V. This molded product sample was subjected to a tensile test with a tensile gage length of 7.62 mm at room temperature at a pulling rate of 200 mm/min. The tensile test was carried out with respect to five molded product samples, and an average of the measured values was obtained.

[Heat Resistance Evaluation]

The above molded product sample was held in a gear oven maintained at 232° C. for 60 days, and then the tensile test was carried out at room temperature to evaluate the tensile elongation. A sample with an elongation of at least 200% can be judged as having favorable heat resistance.

[Evaluation of Stress Crack Resistance]

Using a 30 mm extruder, a 1.8 mm core (tined copper twisted wire) was covered with a fluorinated copolymer composition in a covering thickness of 0.5 mm. The conditions were as follows.

Molding temperature: 320° C., DDR (Draw-Down Ratio): 16, and take-over speed: 10 m/min.

The electric wire covered with the fluorinated copolymer composition was subjected to annealing for 96 hours at predetermined temperatures every 5° C. After the annealing, the electric wire was wound on the electric wire itself for at least 8 rolls (self diameter winding) to prepare a molded product sample. Then, the molded product sample was exposed in a gear oven at 200° C. for one hour, whereupon presence of absence of cracks was confirmed. The sample number was five. The minimum annealing temperature (T1) at which all the five molded product samples had cracks, and the maximum annealing temperature (T2) at which none of the five molded product samples had cracks, were obtained and substituted in the following formula to obtain the stress crack temperature (Tb). The stress crack temperature is the annealing temperature at which 50% of the molded product samples were cracked, determined by the above experiment. The higher the stress crack temperature, the higher the stress crack resistance. The stress crack temperature is preferably at least 195° C.

$$Tb = T1 - \Delta T(S/100 - 1/2)$$

In the above formula,

Tb: stress crack temperature,

T1: minimum annealing temperature at which all the molded product samples had cracks, ΔT: annealing temperature interval (5° C.), S: sum of probability of occurrence (0.5 at the time of 50% occurrence) of cracks at the respective temperatures from the maximum annealing temperature (T2) at which none of the molded product samples had cracks to the minimum annealing temperature (T1) at which all the molded product samples had cracks.

[Measurement of Average Particles Size and BET Specific Surface Area of Copper Oxide]

The average particle size of copper oxide was measured by laser diffraction type particle size distribution measuring apparatus HELOS-RODOS manufactured by Sympatec.

Further, the BET specific surface area of copper oxide was measured by a BET method by nitrogen gas adsorption using SORPTY-1750 manufactured by CarloErba.

Example 1

A polymerization tank equipped with a stirrer having an internal capacity of 94 liter was deaerated, 63.1 kg of 1-hydrotridecafluorohexane, 42.1 kg of 1,3-dichloro-1,1,2,2,3-pentafluoropropane ("AK225cb", tradename, manufactured by Asahi Glass Company, Limited, hereinafter referred to as AK225cb) and 0.7 kg of $CH_2=CHCF_2CF_2CF_2CF_3$ (hereinafter referred to as PFBE) were charged, 13.9 kg of TFE and 0.5 kg of E were injected, the temperature in the polymerization tank was raised to 66° C., and 460 mL of a 1 mass % AK225cb solution of tertiary butyl peroxypivalate (hereinafter referred to as PBPV) as a polymerization initiator solution was charged to initiate the polymerization.

A monomer mixture gas in a molar ratio of TFE/E=60/40 was continuously charged to achieve a constant pressure during the polymerization. Further, in accordance with charging of the monomer mixture gas, PFBE in an amount corresponding to 2.0 mol % to the total number of moles of TFE and E was continuously charged. 6.0 Hours after initiation of the polymerization, at the time when 7.4 kg of the monomer mixture gas was charged, the internal temperature of the polymerization tank was decreased to room temperature and the pressure in the polymerization tank was purged to normal pressure.

The obtained slurry of ETFE 1 was put in a granulation tank of 220 L (liter) in which 77 kg of water was charged, and heated to 105° C. with stirring for granulation while the solvent was removed by distillation. The obtained granules were dried at 150° C. for 5 hours to obtain 7.3 kg of granules 1 of ETFE 1. ETFE 1 had a copolymer composition comprising repeating units based on TFE/repeating units based on E/repeating units based on PFBE in a molar ratio of 57.6/40.3/2.1. The ETFE had a melting point of 244° C. and a volume flow rate (melt flow rate) of 27 g/10 min.

0.5 ppm of cupric oxide (average particle size: 0.8 μm, BET specific surface area: 12 $m^2$/g) was added to the obtained granules 1, followed by melt extrusion by a 30 mm extruder under conditions of a cylinder temperature of from 260 to 280° C., a die temperature of 300° C. and a number of revolutions of screw of 30 rpm to prepare pellets 1 of fluorinated copolymer composition 1. The volume flow rate of the pellets 1 was 27 g/10 min. The obtained pellets 1 were press-molded at 300° C. to form a 1 mm thick sheet 1 (molded product of fluorinated copolymer composition 1).

The initial tensile elongation of the sheet 1 was 535%. After the heat resistance test at 232° C. for 60 days, the tensile elongation was 399%. Further, the stress crack temperature was 198.5° C.

Example 2

Pellets 2 of a fluorinated copolymer composition 2 were prepared by carrying out melt extrusion in the same manner as in Example 1 except that 5 ppm of cupric oxide was added to the granules 1. The volume flow rate of the pellets 2 was 27 g/10 min. The obtained pellets 2 were press-molded at 300° C. to form a 1 mm thick sheet 2 (molded product of fluorinated copolymer composition 2).

The initial tensile elongation of the sheet 2 was 540%. After the heat resistance test at 232° C. for 60 days, the tensile elongation was 307%. Further, the stress crack temperature was 198.5° C.

Example 3

Granules 2 of ETFE 2 comprising repeating units based on TFE/repeating units based on E/repeating units based on PFEE in a molar ratio of 59.1/39.1/1.8, and having a melting point of 245° C. and a volume flow rate (melt flow rate) of 28 g/10 min were obtained in the same manner as in Example 1.

To the obtained granules 2, 1.5 ppm of cupric oxide (average particle size: 0.8 μm, BET specific surface area: 12 $m^2$/g) was added, followed by melt extrusion by a 30 mm extruder under conditions of a cylinder temperature of from 260 to 280° C., a die temperature of 300° C. and a number of revolutions of screw of 30 rpm to prepare pellets 3 of a fluorinated copolymer composition 3. The volume flow rate of the pellets 3 was 28 g/10 min. The obtained pellets 3 were press-molded at 300° C. to form a 1 mm thick sheet 3 (molded product of fluorinated copolymer composition 3).

The initial tensile elongation of the sheet 3 was 480%. After the heat resistance test at 232° C. for 60 days, the tensile elongation was 385%. Further, the stress crack temperature was 197.5° C.

Comparative Example 1

Pellets 4 of a fluorinated copolymer composition 4 were prepared by carrying out melt extrusion in the same manner as in Example 1 except that 15 ppm of cupric oxide was added to the granules 1. The volume flow rate of the pellets 4 was 27 g/10 min. The obtained pellets 4 were press-molded at 300° C. to form a 1 mm thick sheet 4 (molded product of fluorinated copolymer composition 4).

The initial tensile elongation of the sheet 4 was 530%. After the heat resistance test at 232° C. for 60 days, the tensile elongation was 150%. Further, the stress crack temperature was 197.5° C.

Comparative Example 2

Pellets 5 were prepared by carrying out melt extrusion of the granules 1 in the same manner as in Example 1 except that cupric oxide was not added. The obtained pellets 5 were press-molded at 300° C. to form a 1 mm thick sheet 5 (molded product of ETFE 1).

The initial tensile elongation of the sheet 5 was 530%. After the heat resistance test at 232° C. for 60 days, the tensile elongation was 165%. Further, the stress crack temperature was 194.5° C.

Comparative Example 3

A polymerization tank equipped with a stirrer having an internal capacity of 94 liter was deaerated, 71.0 kg of 1-hydrotridecafluorohexane, 35.1 kg of AK225cb and 0.6 kg of PFBE were charged, 13.2 kg of TFE and 0.8 kg of E were injected, the temperature in the polymerization tank was raised to 66° C., and 430 mL of a 1 mass % AK225cb solution of PBPV as a polymerization initiator solution was injected to initiate the polymerization.

A monomer mixture gas in a molar ratio of TFE/E=54/46 was continuously charged to achieve a constant pressure during the polymerization. Further, in accordance with charging of the monomer mixture gas, PFBE in an amount corresponding to 1.5 mol % to the total number of moles of TFE and E was continuously charged. 7.0 Hours after initiation of the polymerization, at the time when 7.1 kg of the monomer mixture gas was charged, the internal temperature of the polymerization tank was decreased to room temperature and the pressure in the polymerization tank was purged to normal pressure. The obtained slurry of ETFE 3 was put in a granulation tank of 220 L in which 77 kg of water was charged, and heated to 105° C. with stirring for granulation while the solvent was removed by distillation. The obtained granules were dried at 150° C. for 5 hours to obtain 7.0 kg of granules 3 of ETFE 3.

ETFE 3 had a copolymer composition comprising repeating units based on TFE/repeating units based on E/repeating units based on PFBE in a molar ratio of 53.1/45.3/1.6, and had a melting point of 261° C. and a volume flow rate (melt flow rate) of 30 g/10 min.

The obtained granules 3 of ETFE 3 were subjected to melt-extrusion in the same manner as in Comparative Example 2 to prepare pellets 6. The obtained pellets 6 were press-molded at 300° C. to form a 1 mm thick sheet 6 (molded product of ETFE 3).

The initial tensile elongation of the sheet 6 was 510%. After the heat resistance test at 232° C. for 60 days, the tensile elongation was 60%. Further, the stress crack temperature was 181.5° C.

Comparative Example 4

7.2 kg of granules 4 of ETFE 4 were obtained in the same manner as in Comparative Example 3 except that a polymerization tank equipped with a stirrer having an internal capacity of 94 litter was deaerated, and 78.1 kg of 1-hydrotridecafluorohexane, 29.0 kg of AK225cb and 0.6 kg of PFBE were charged.

ETFE 4 had a copolymer composition comprising repeating units based on TFE/repeating units based on E/repeating units based on PFBE in a molar ratio of 53.2/45.3/1.5, a melting point of 262° C. and a volume flow rate (melt flow rate) of 12 g/10 min.

The obtained granules of ETFE 4 were subjected to melt extrusion in the same manner as in Comparative Example 2 to prepare pellets 7. The obtained pellets 7 were press-molded at 300° C. to form a 1 mm thick sheet 7 (molded product of ETFE 4).

The initial tensile elongation of the sheet 7 was 500%. After the heat resistance test at 232° C. for 60 days, the tensile elongation was 60%. Further, the stress crack temperature was 192.5° C.

The above results are summarized in Tables 1 and 2.

TABLE 1

|  |  | Ex. 1 | Ex. 2 | Ex. 3 |
|---|---|---|---|---|
| ETFE copolymer composition | TFE (mol %) | 57.6 | 57.6 | 59.1 |
|  | E (mol %) | 40.3 | 40.3 | 39.1 |
|  | PFBE (mol %) | 2.1 | 2.1 | 1.8 |
|  | E/TFE (molar ratio) | 41/59 | 41/59 | 40/60 |
| Amount (ppm) of addition of copper oxide |  | 0.5 | 5 | 1.5 |
| Melting point (° C.) of ETFE |  | 244 | 244 | 245 |
| Volume flow rate (g/10 min) of ETFE |  | 27 | 27 | 28 |
| Volume flow rate (g/10 min) of fluorinated copolymer composition |  | 27 | 27 | 28 |
| Tensile elongation of molded product | Initial | 535 | 540 | 480 |
|  | After 60 days | 399 | 307 | 385 |
| Stress crack temperature (° C.) of molded product |  | 198.5 | 198.5 | 197.5 |

TABLE 2

|  |  | Comp. Ex. 1 | Comp. Ex. 2 | Comp. Ex. 3 | Comp. Ex. 4 |
|---|---|---|---|---|---|
| ETFE copolymer composition | TFE (mol %) | 57.6 | 57.6 | 53.1 | 53.2 |
|  | E (mol %) | 40.3 | 40.3 | 45.3 | 45.3 |
|  | PFBE (mol %) | 2.1 | 2.1 | 1.6 | 1.5 |
|  | E/TFE (molar ratio) | 41/59 | 41/59 | 46/54 | 46/54 |
| Amount (ppm) of addition of copper oxide |  | 15 | 0 | 0 | 0 |
| Melting point (° C.) of ETFE |  | 244 | 244 | 261 | 262 |
| Volume flow rate (g/10 min) of ETFE |  | 27 | 27 | 30 | 12 |
| Volume flow rate (g/10 min) of fluorinated copolymer composition |  | 27 | — | — | — |
| Tensile elongation of molded product | Initial | 530 | 530 | 510 | 500 |
|  | After 60 days | 150 | 165 | 60 | 60 |
| Stress crack temperature (° C.) of molded product |  | 197.5 | 194.5 | 181.5 | 192.5 |

As evident from the above results, in Examples 1 to 3, the fluorinated copolymer composition had a high volume flow rate, excellent flowability and excellent high speed moldability. Further, the stress crack temperature of the molded product (electric wire) was at least 195° C. in each Example, whereby excellent stress crack resistance was demonstrated. Further, of each of the molded products (sheets), the tensile elongation after being held in the gear oven maintained at 232° C. for 60 days was at least 200%, whereby excellent heat resistance was demonstrated.

Whereas in Comparative Example 1 in which copper oxide was added to ETFE in an amount exceeding 10 ppm and in Comparative Examples 2 to 4 in which no copper oxide was added, the molded product was inferior in the heat resistance. Further, as shown in Comparative Examples 3 and 4, if the molar ratio (E/TFE) of the repeating units (A) based on E to the repeating units (B) based on TFE in the copolymer composition of ETFE is out of the range of from 38/62 to 44/56, the stress crack resistance was low. In order to obtain the stress crack resistance at the same level, it is necessary to increase the molecular weight of ETFE thereby to lower the volume flow rate, and it was not possible to satisfy both the stress crack resistance and the moldability.

INDUSTRIAL APPLICABILITY

The fluorinate copolymer composition of the present invention is excellent in moldability by high speed molding. Further, a molded product of the fluorinated copolymer composition to be obtained is excellent in the stress crack resistance and is excellent in the moldability. Accordingly, it is suitably used for electric wire covering materials for various devices, such as (1) electric wire covering materials for electric machines and domestic electric apparatus, such as robots, electric motors, power generators and transformers, (2) electric wire covering materials for communication transmission apparatus such as telephones and radios, (3) electric wire covering materials for electronic apparatus such as computers, data communication equipment and terminal equipment, (4) electric wire covering materials for railway vehicles, (5) electric wire covering materials for automobiles, (6) electric wire covering materials for aircraft, (7) electric wire covering material for shipping, and (8) electric wire covering materials for system configuration for e.g. electrical mains for buildings and plants, electric power plants and petrochemical and iron manufacturing plants.

This application is a continuation of PCT Application No. PCT/JP2012/068390, filed on Jul. 19, 2012, which is based upon and claims the benefit of priority from Japanese Patent Application No. 2011-162683 filed on Jul. 26, 2011. The contents of those applications are incorporated herein by reference in its entirety.

What is claimed is:

1. A fluorinated copolymer composition comprising an ethylene/tetrafluoroethylene copolymer and copper oxide,
wherein the ethylene/tetrafluoroethylene-containing copolymer comprises repeating units (A) based on ethylene, repeating units (B) based on tetrafluoroethylene and repeating units (C) based on another monomer excluding ethylene and tetrafluoroethylene, copolymerizable with ethylene and tetrafluoroethylene, in a molar ratio of the repeating units (A) based on ethylene to the repeating units (B) based on tetrafluoroethylene of from 38/62 to 44/56, and in an amount of the repeating units (C) based on another monomer of from 0.1 to 2.6 mol % in all the repeating units of the ethylene/tetrafluoroethylene-containing copolymer;
the content of the copper oxide is from 0.2 to 10 ppm based on the total weight of ethylene/tetrafluoroethylene-containing copolymer;
the copper oxide has a BET surface area of from 5 to 30 $m^2/g$; and
the volume flow rate of the fluorinated copolymer composition at 297° C. is from 15 to 150 g/10 min.

2. The fluorinated copolymer composition according to claim 1, wherein the molar ratio of the repeating units (A) based on ethylene to the repeating units (B) based on tetrafluoroethylene is from 39/61 to 42/58.

3. The fluorinated copolymer composition according to claim 1, wherein the melting point of the ethylene/tetrafluoroethylene-containing copolymer is from 235 to 275° C.

4. The fluorinated copolymer composition according to claim 1, wherein the copper oxide has an average particle size of from 0.1 to 10 µm.

5. The fluorinated copolymer composition according to claim 1, wherein the copper oxide is cupric oxide.

6. The fluorinated copolymer composition according to claim 1, wherein the content of the copper oxide is from 0.5 to 5 ppm based on the total weight of ethylene/tetrafluoroethylene-containing copolymer.

7. The fluorinated copolymer composition according to claim 1, wherein the another monomer is a compound represented by $CH_2=CX(CF_2)_nY$, wherein each of X and Y which are independent of each other, is a hydrogen atom or a fluorine atom, and n is an integer of from 1 to 10.

8. The fluorinated copolymer composition according to claim 7, wherein the another monomer is a compound represented by $CH_2=CH(CF_2)_nF$, wherein n is an integer of from 2 to 8.

9. The fluorinated copolymer composition according to claim 7, wherein the another monomer is a compound represented by $CH_2=CH(CF_2)_nF$, wherein n is an integer of 2, 4, or 6.

10. The fluorinated copolymer composition according to claim 1, wherein the volume flow rate of the fluorinated copolymer composition is from 20 to 60 g/10 min.

11. The fluorinated copolymer composition according to claim 1, wherein the amount of the repeating units (C) based on another monomer is from 0.2 to 2.5 mol % in all the repeating units of the ethylene/tetrafluoroethylene-containing copolymer.

12. The fluorinated copolymer composition according to claim 1, wherein the amount of the repeating units (C) based on another monomer is from 0.5 to 2.3 mol % in all the repeating units of the ethylene/tetrafluoroethylene-containing copolymer.

13. The fluorinated copolymer composition according to claim 1, wherein the average particle size of the copper oxide is from 0.5 to 5 µm.

14. The fluorinated copolymer composition according to claim 1, wherein the BET surface area of the copper oxide is 10 to 20 $m^2/g$.

* * * * *